US010687295B2

(12) United States Patent
Nakano et al.

(10) Patent No.: US 10,687,295 B2
(45) Date of Patent: *Jun. 16, 2020

(54) COMMUNICATION DEVICE, COMMUNICATION METHOD, AND COMMUNICATION SYSTEM WITH DESYNCHRONIZATION DETECTION

(71) Applicant: Sony Corporation, Tokyo (JP)

(72) Inventors: Hiroaki Nakano, Tokyo (JP); Hiroaki Fujita, Kanagawa (JP); Uichiro Omae, Kanagawa (JP); Tetsuya Fujiwara, Kanagawa (JP); Hiroya Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 15/735,456

(22) PCT Filed: Jun. 17, 2016

(86) PCT No.: PCT/JP2016/068063
§ 371 (c)(1),
(2) Date: Dec. 11, 2017

(87) PCT Pub. No.: WO2017/013975
PCT Pub. Date: Jan. 26, 2017

(65) Prior Publication Data
US 2018/0160383 A1 Jun. 7, 2018

(30) Foreign Application Priority Data
Jul. 17, 2015 (JP) ................. 2015-142643

(51) Int. Cl.
*H04W 56/00* (2009.01)
*H04B 5/00* (2006.01)
(Continued)

(52) U.S. Cl.
CPC ........ *H04W 56/003* (2013.01); *H04B 5/0031* (2013.01); *H04B 5/0075* (2013.01);
(Continued)

(58) Field of Classification Search
CPC ............ H04W 56/003; H04W 56/001; H04W 56/0065; H04W 4/80; H04B 5/0031;
(Continued)

(56) References Cited

U.S. PATENT DOCUMENTS 4,816,769 A * 3/1989 Ma ....................... H03D 1/2254
329/315
5,844,920 A * 12/1998 Zook ..................... G11B 5/012
714/769

(Continued)

FOREIGN PATENT DOCUMENTS

JP 2009-175976 A 8/2009
JP 2011-254156 A 12/2011
(Continued)

*Primary Examiner* — Ian N Moore
*Assistant Examiner* — Latresa A McCallum
(74) *Attorney, Agent, or Firm* — Michael Best & Friedrich LLP

(57) ABSTRACT

A communication device of the disclosure includes a phase synchronizer, a first modulator, and a detector. The phase synchronizer generates a second signal on a basis of a first signal received from a communication partner. The first modulator is able to modulate the first signal on a basis of the second signal. The detector detects that synchronization between the first signal and the second signal is lost.

24 Claims, 13 Drawing Sheets

(51) Int. Cl.
*H04L 27/06* (2006.01)
*H04L 27/04* (2006.01)
*H04L 7/00* (2006.01)
*H04L 27/00* (2006.01)
*H04L 7/033* (2006.01)
*H04W 4/80* (2018.01)
*H04L 27/34* (2006.01)

(52) U.S. Cl.
CPC .............. *H04L 27/04* (2013.01); *H04L 27/06* (2013.01); *H04L 27/066* (2013.01); *H04W 56/001* (2013.01); *H04W 56/0065* (2013.01); *H04L 7/0083* (2013.01); *H04L 7/033* (2013.01); *H04L 7/0331* (2013.01); *H04L 27/34* (2013.01); *H04L 2027/0024* (2013.01); *H04W 4/80* (2018.02)

(58) Field of Classification Search
CPC ....... H04B 5/0075; H04L 27/04; H04L 27/06; H04L 27/066; H04L 7/0083; H04L 7/033; H04L 7/0331; H04L 27/34; H04L 2027/0024

See application file for complete search history.

(56) References Cited

U.S. PATENT DOCUMENTS 5,949,826 A * 9/1999 Iiyama ................ H04L 27/2334
332/102
2013/0005243 A1* 1/2013 Royston ............... H04B 5/0043
455/41.1

FOREIGN PATENT DOCUMENTS

JP 2012-205137 A 10/2012
JP 2013-062605 A 4/2013

* cited by examiner

[FIG. 1]
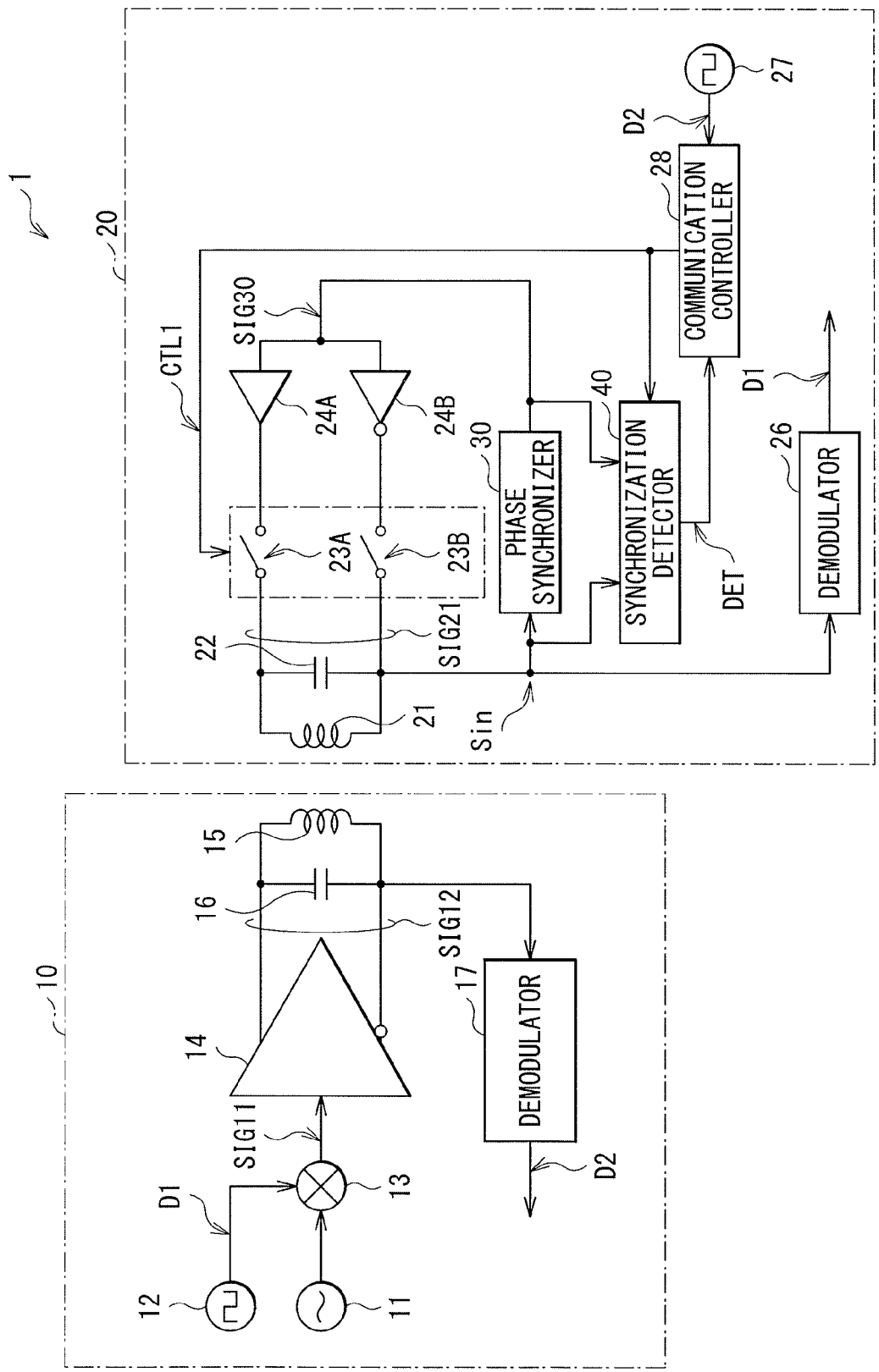

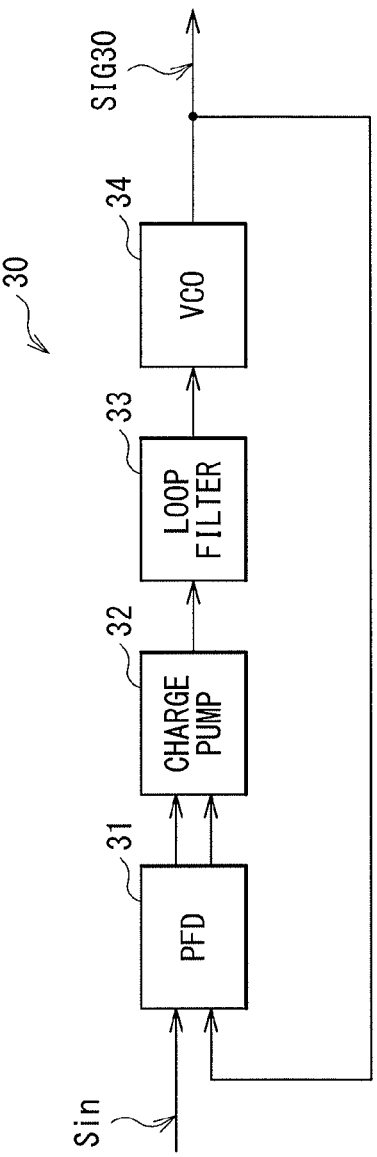
[ FIG. 2 ]

[ FIG. 3 ]
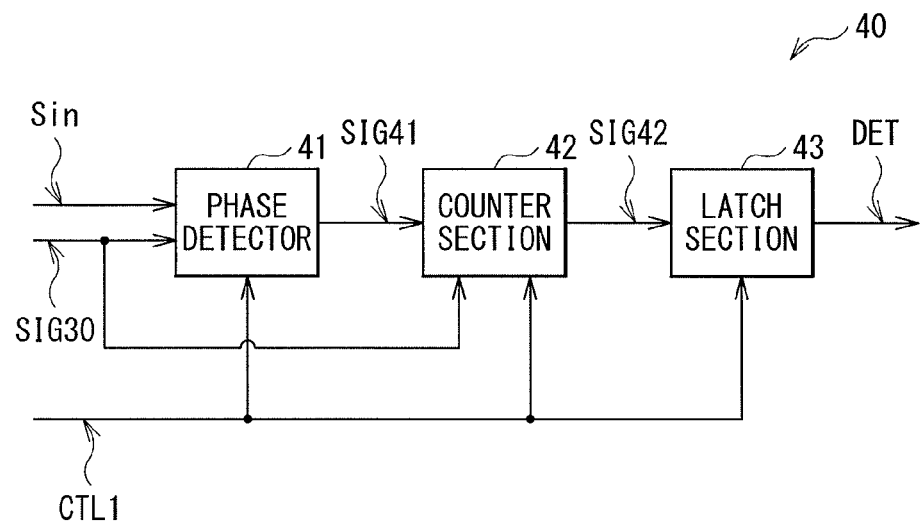
[ FIG. 4 ]
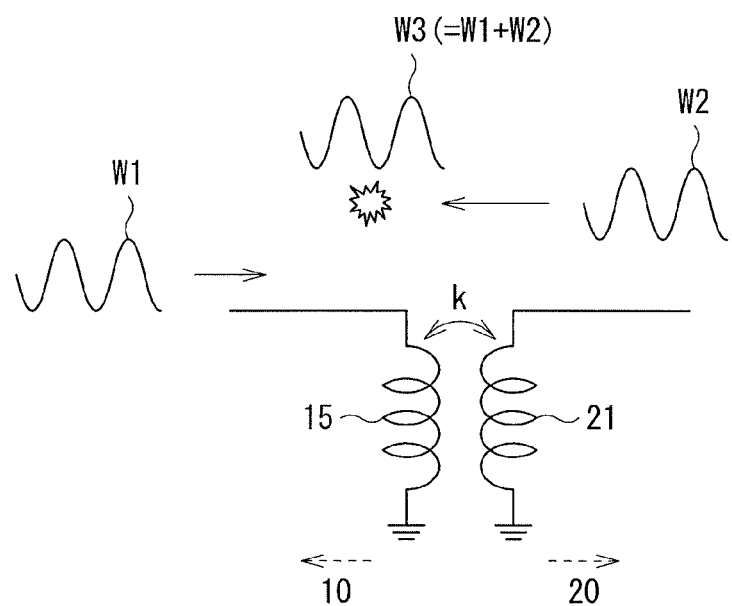

[ FIG. 5 ]
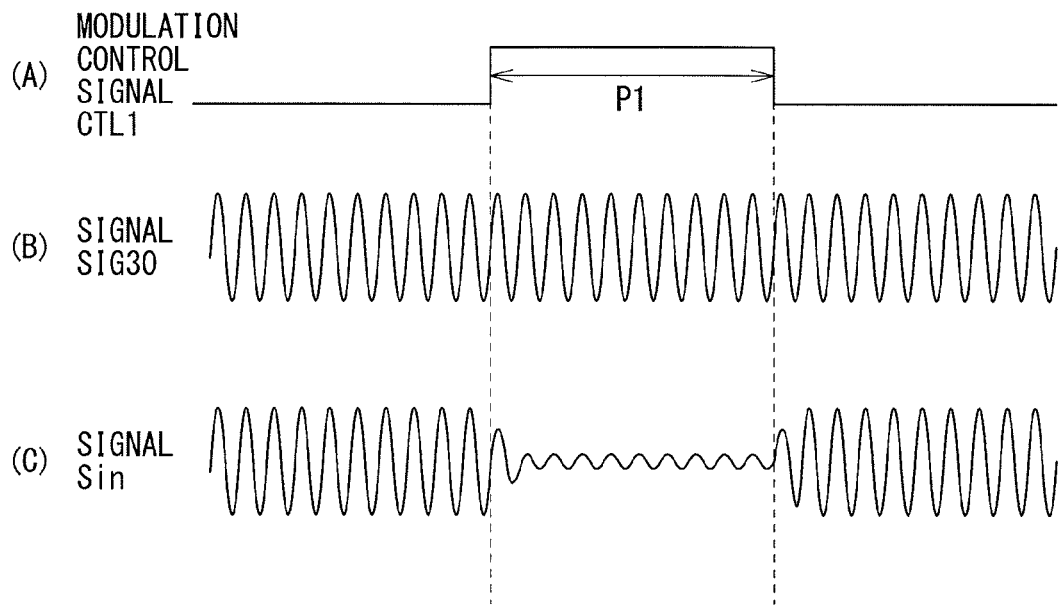
[ FIG. 6 ]
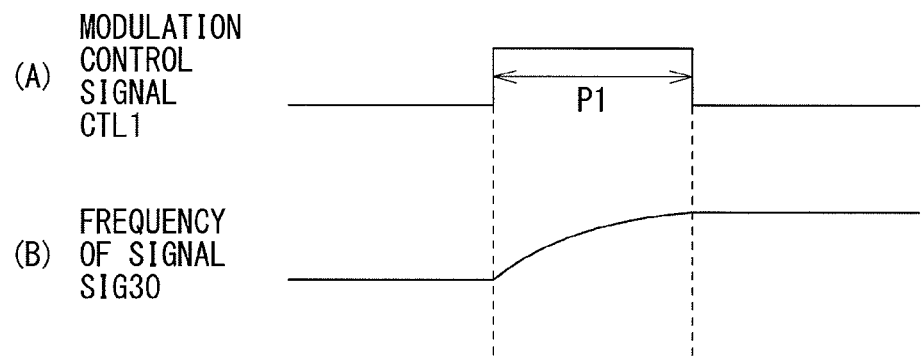

[ FIG. 7 ]
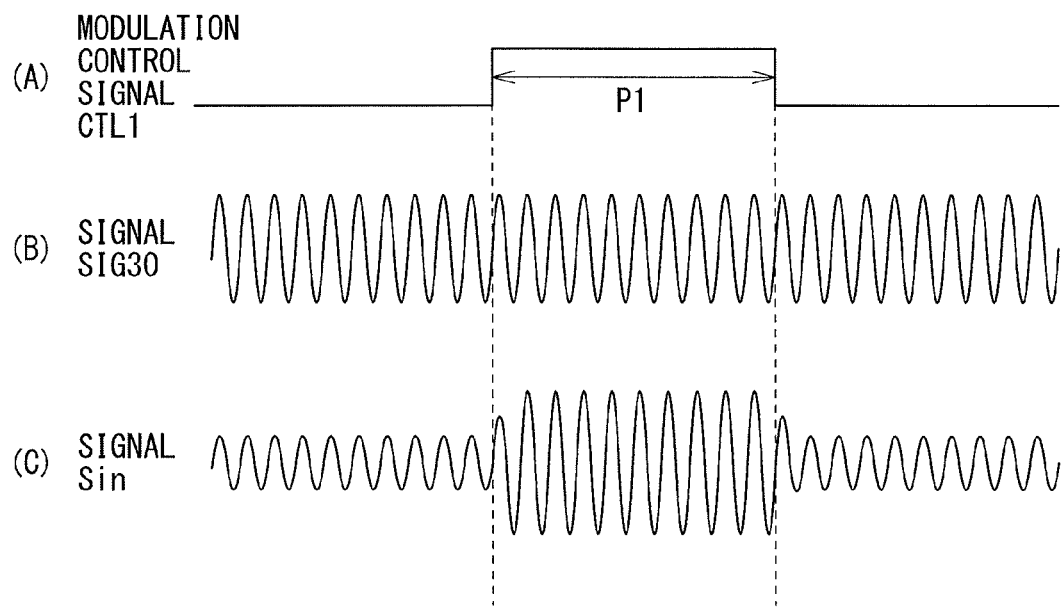
[ FIG. 8 ]
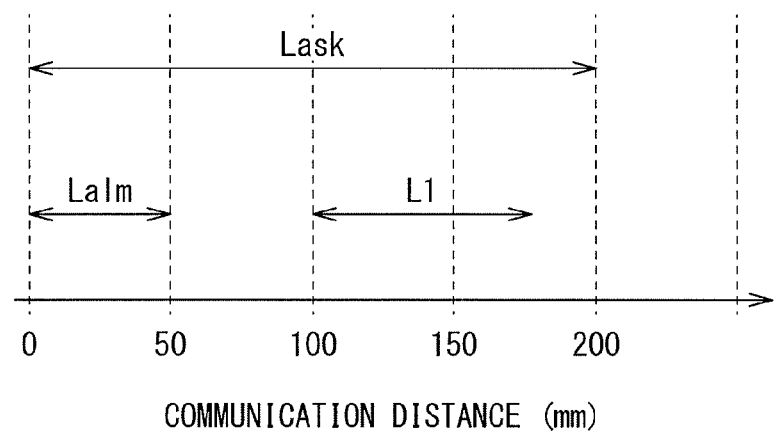

[ FIG. 9 ]
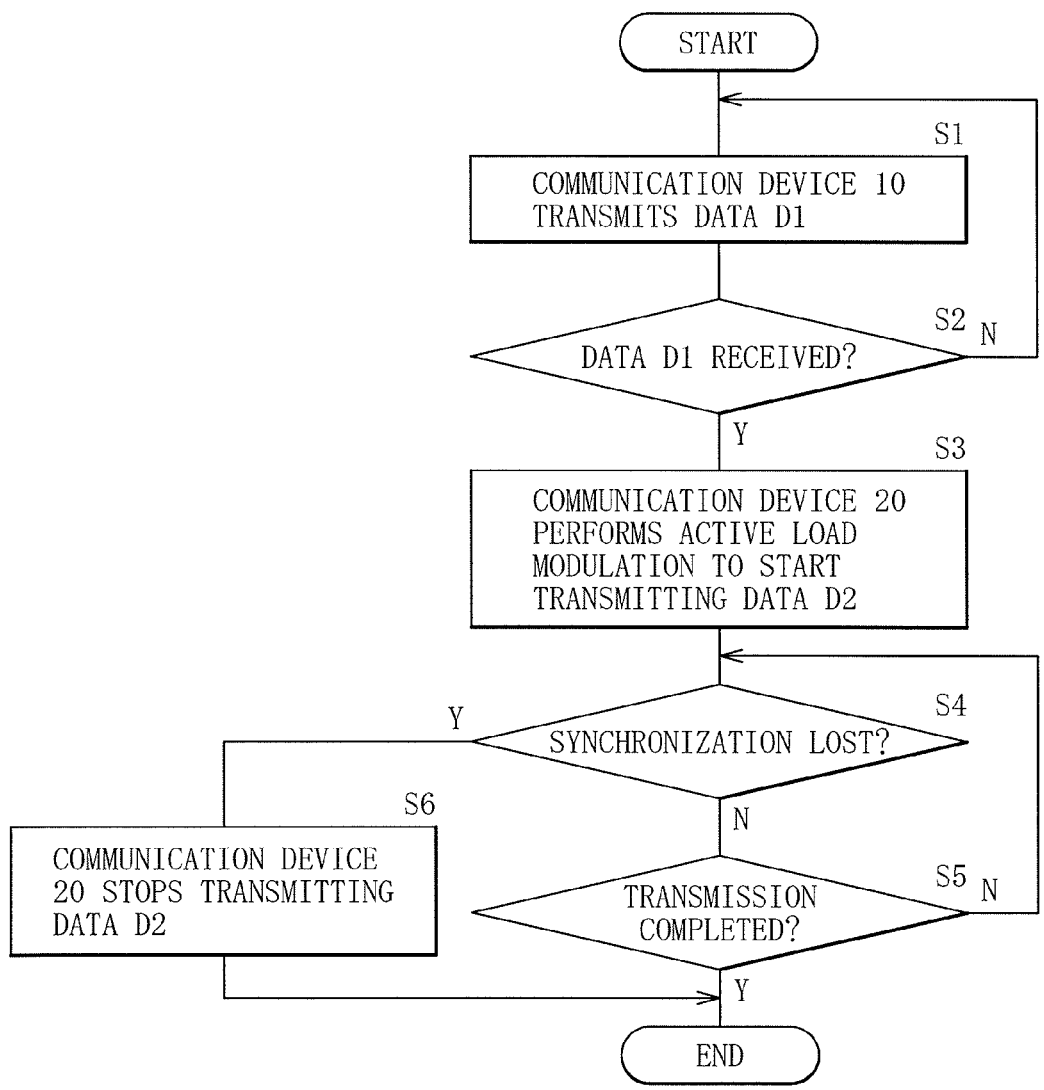

[ FIG. 10 ]
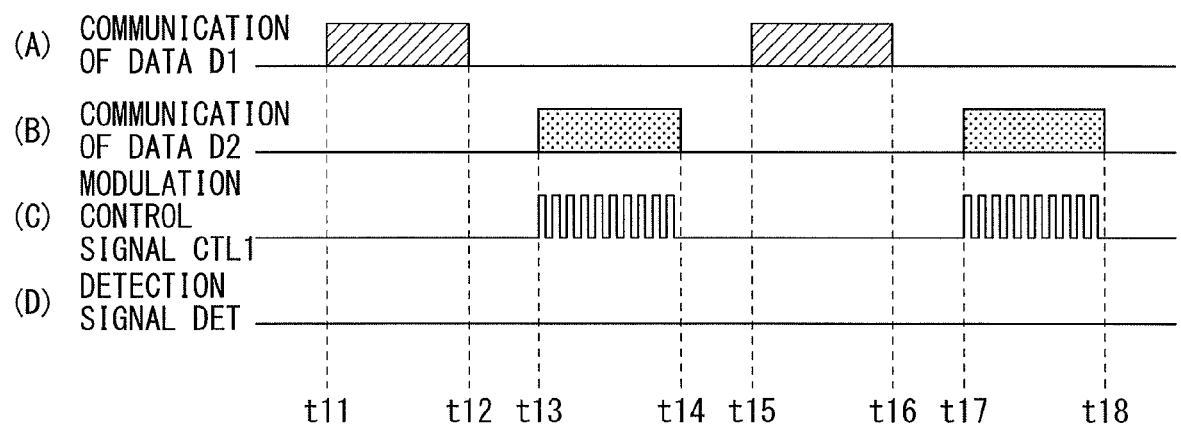
[ FIG. 11 ]
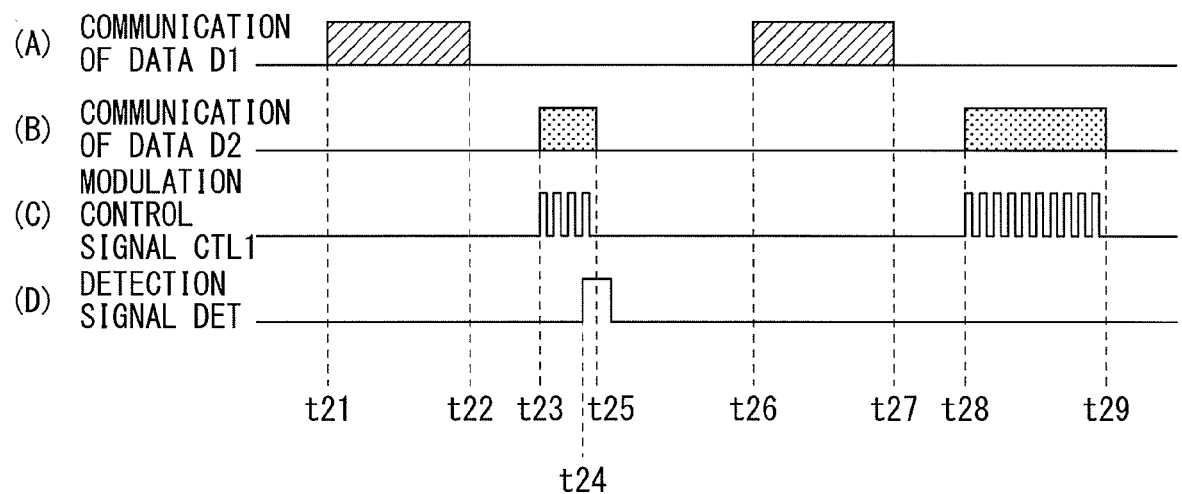

[ FIG. 12 ]
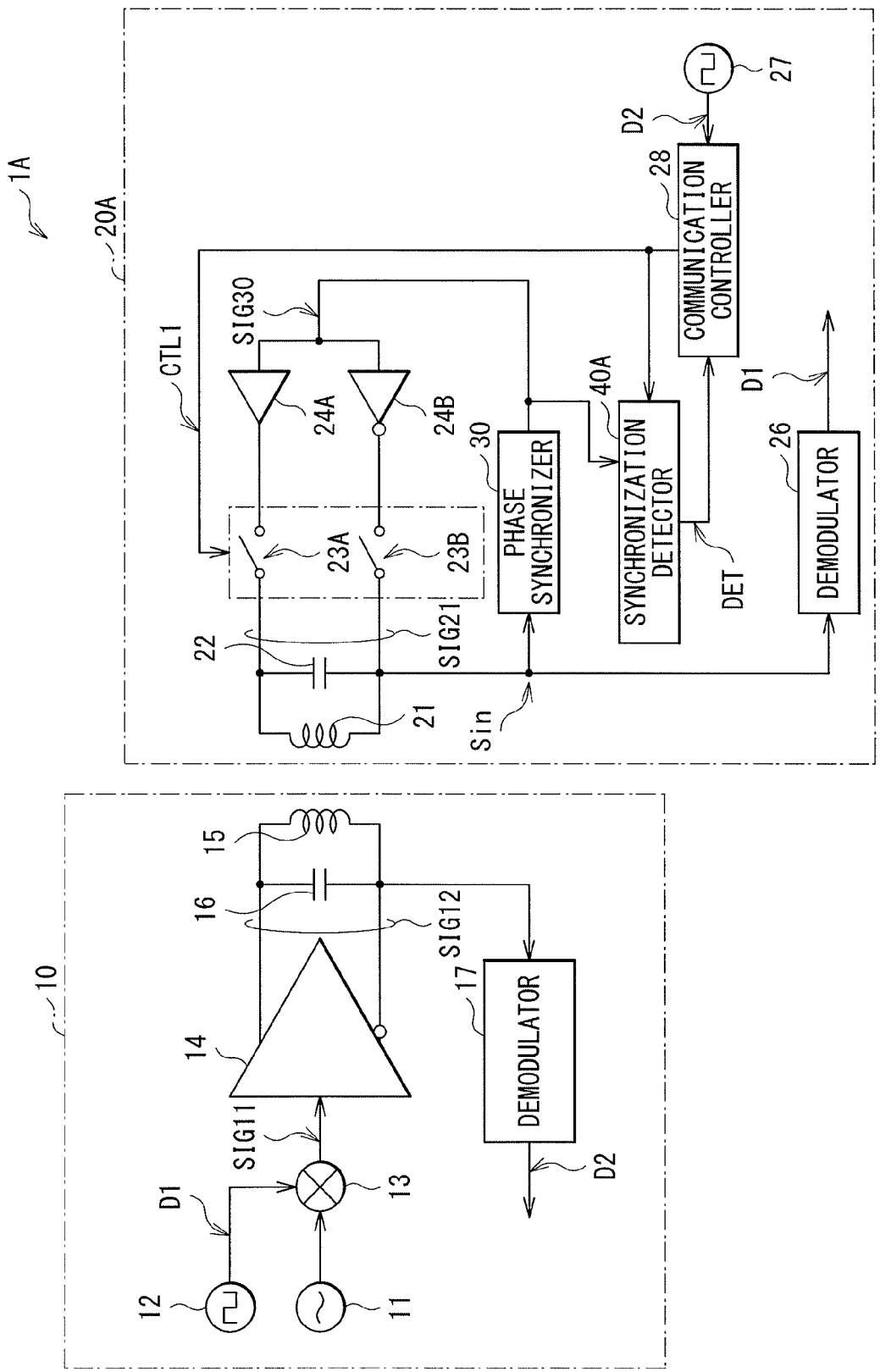

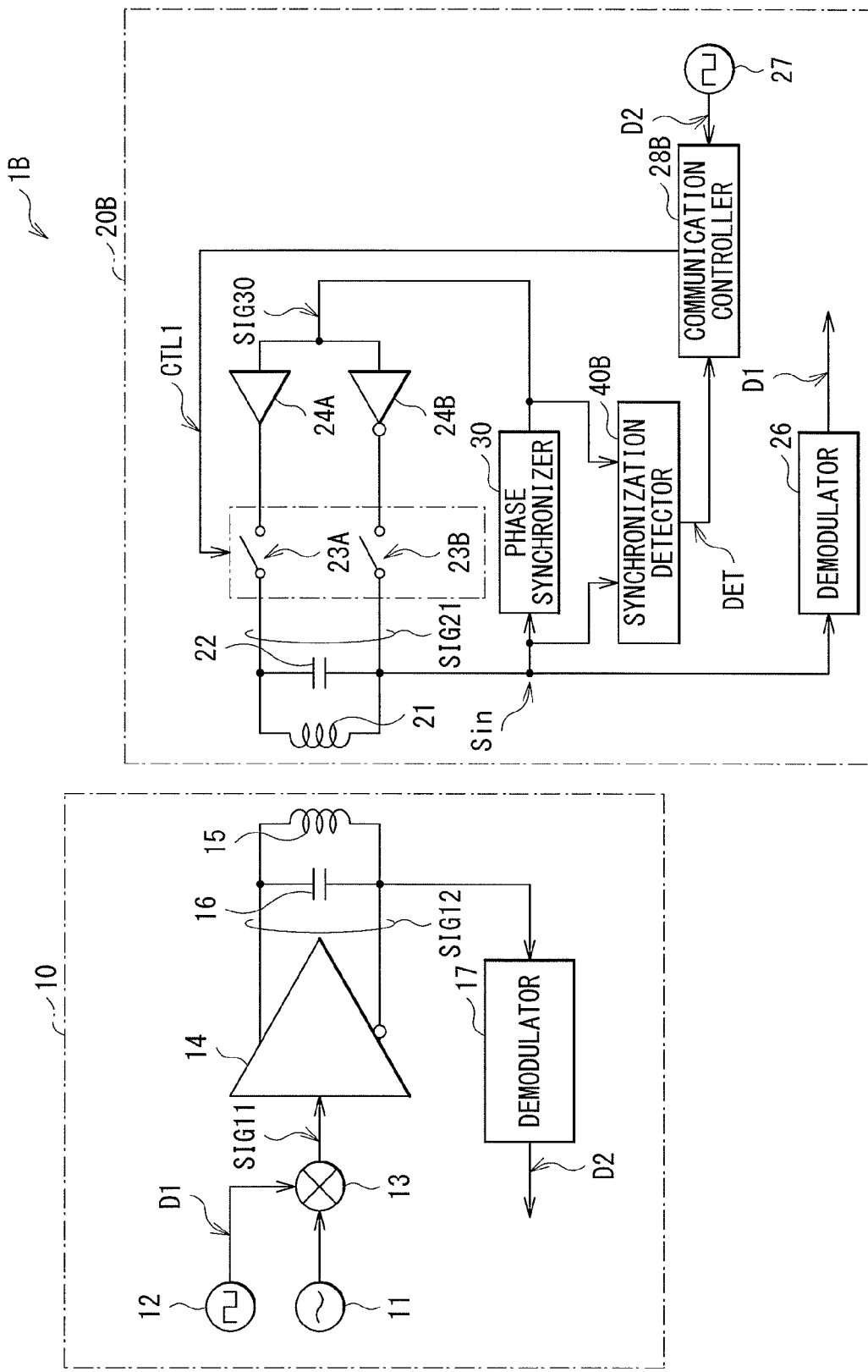
[ FIG. 13 ]

[ FIG. 14 ]
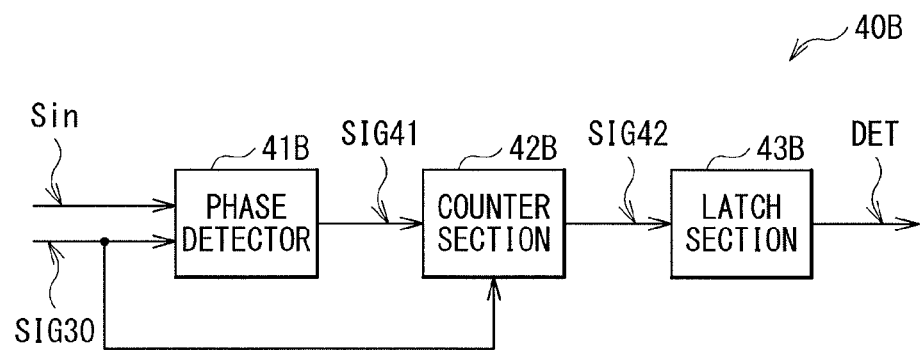

[ FIG. 15 ]
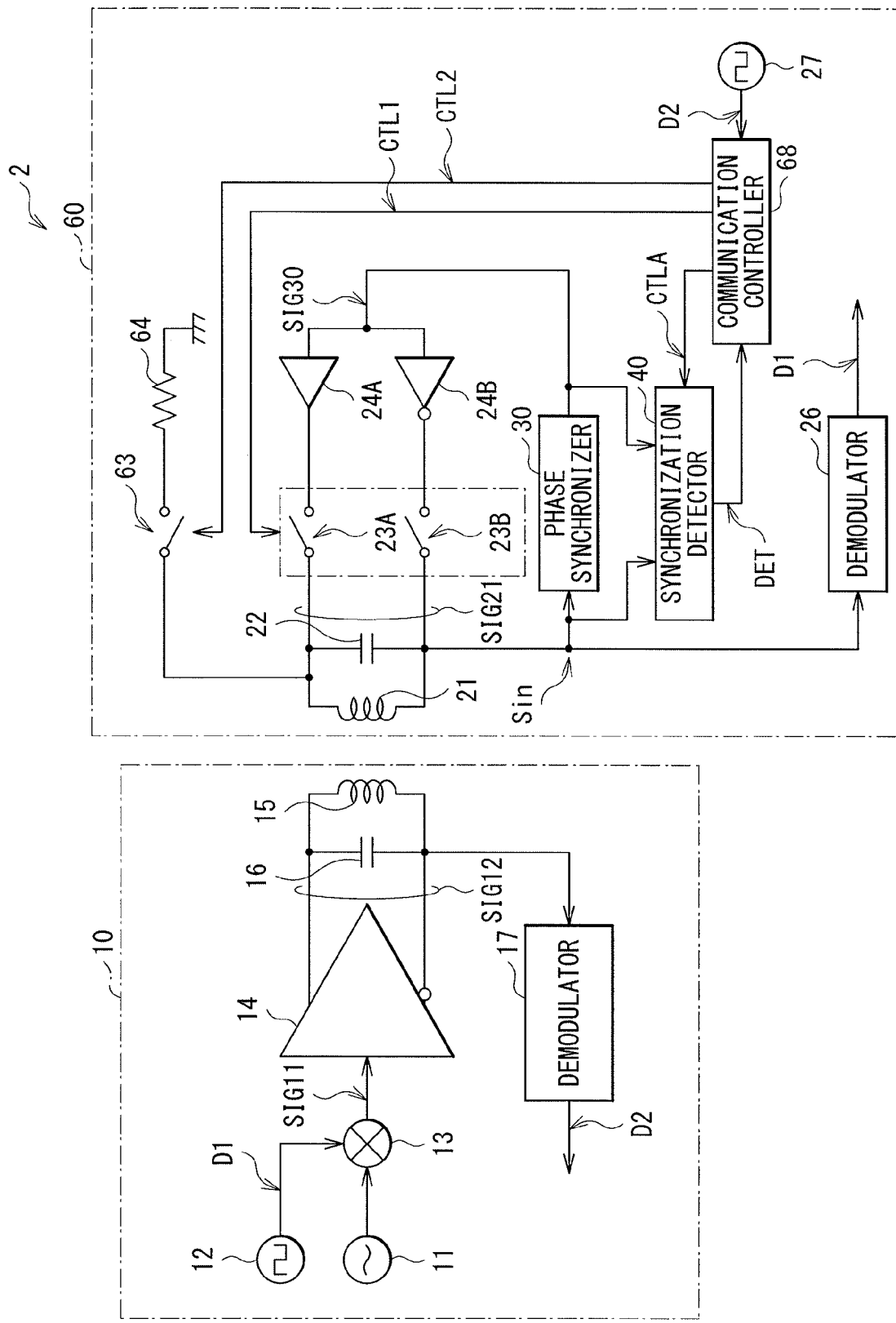

[ FIG. 16 ]
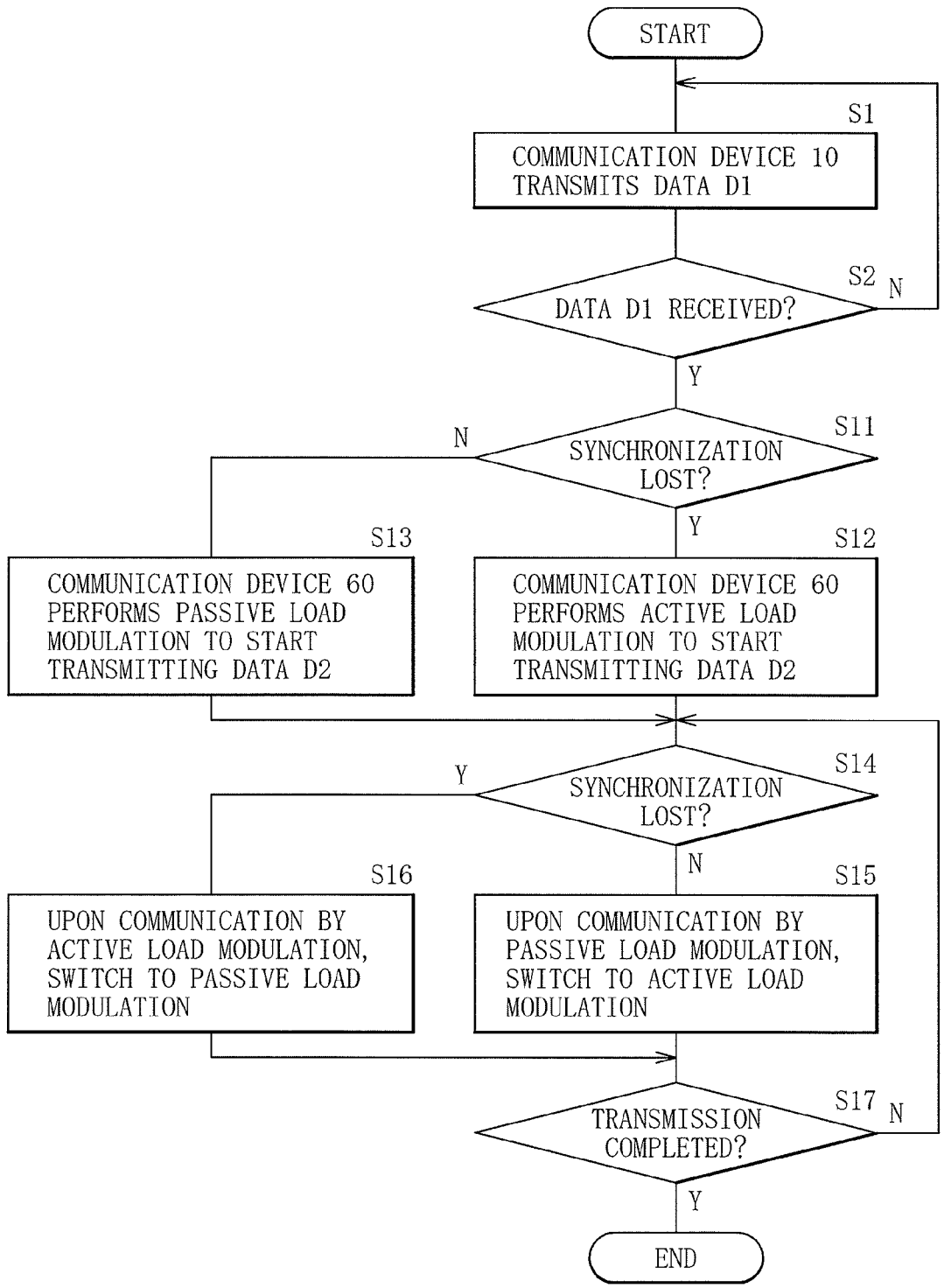

[ FIG. 17 ]
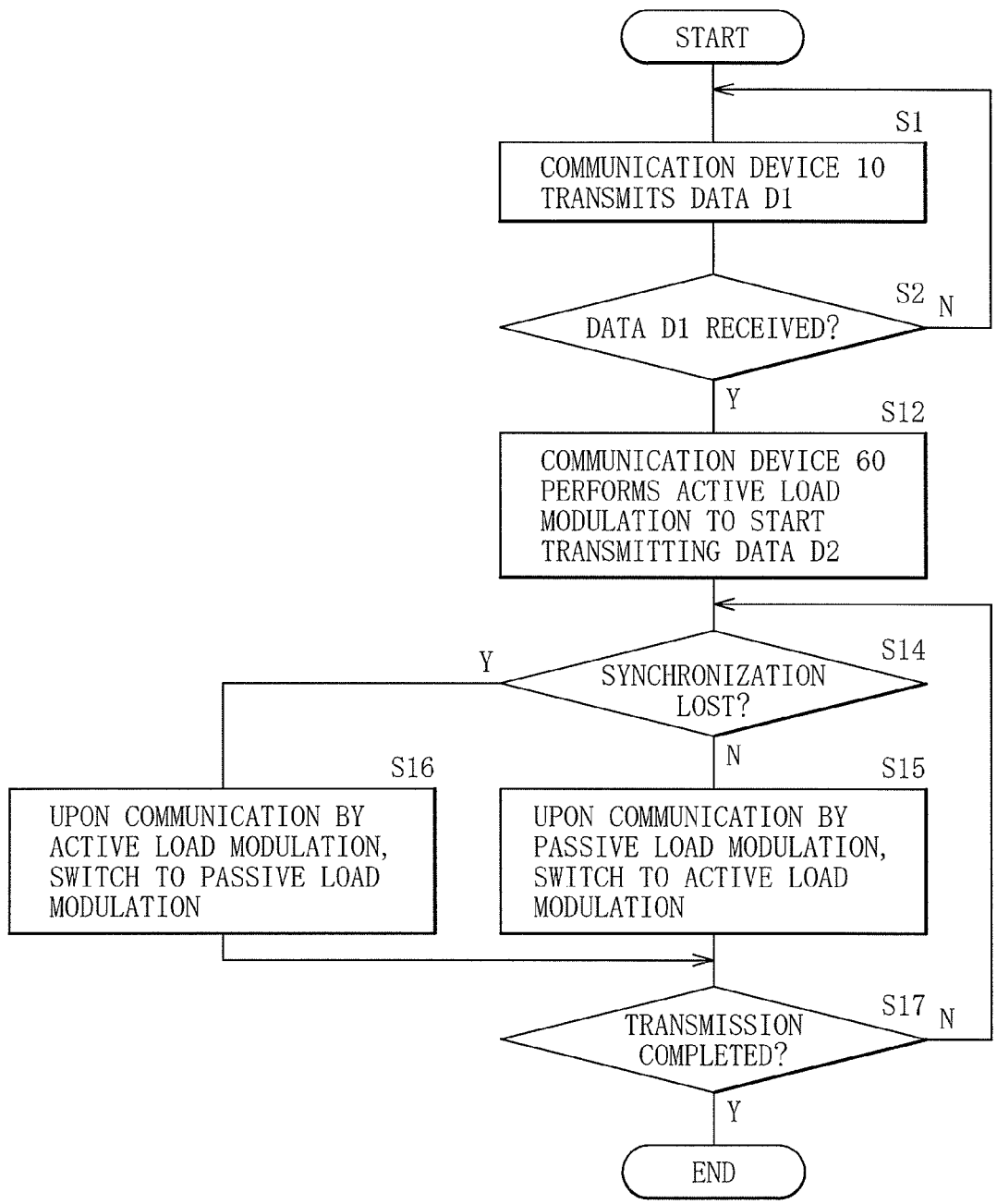

COMMUNICATION DEVICE, COMMUNICATION METHOD, AND COMMUNICATION SYSTEM WITH DESYNCHRONIZATION DETECTION

TECHNICAL FIELD

The disclosure relates to: a communication device used for near field communication (NFC); a communication method used for such a communication device; and a communication system including such a communication device.

BACKGROUND ART

The near field communication is a technique increasingly used mainly in Asian areas in the fields of traffic systems, accounting, and certification, for example. This technique has been approved as an international standard. The specification for the near field communication, which is also referred to below as the NFC specification, has compatibility, i.e., so-called upward compatibility, for example, with various other specifications, such as Type A, Type B, FeliCa (registered trademark), and ISO15693 specifications. In other words, when a reader-writer or a card is compatible with the NFC specification, it is also compatible with all of those specifications.

In the near field communication, as an example, a reader-writer subjects data to an amplitude shift keying (ASK) modulation and then transmits this data to a card. In turn, the card subjects data to a load modulation and then transmits this data to the reader-writer. PTLs 1 and 2 disclose examples of a communication device that is able to conduct communication using a load modulation, specifically, a passive load modulation.

On the other hand, some electronic circuits use phase locked loop (PLL) circuits, as disclosed in PTL 3, for example.

CITATION LIST

Patent Literature

PTL 1: Japanese Unexamined Patent Application Publication No. 2013-62605
PTL 2: Japanese Unexamined Patent Application Publication No. 2011-254156
PTL 3: Japanese Unexamined Patent Application Publication No. 2012-205137

SUMMARY OF INVENTION

In general, communications of enhanced qualities are demanded. Further improvements in communication qualities are expected.

It is desirable to provide a communication device, a communication method, and a communication system that make it possible to enhance a communication quality.

A communication device according to an embodiment of the disclosure includes a phase synchronizer, a first modulator, and a detector. The phase synchronizer generates a second signal on a basis of a first signal received from a communication partner. The first modulator is able to modulate the first signal on a basis of the second signal. The detector detects that synchronization between the first signal and the second signal is lost.

A communication method according to an embodiment of the disclosure includes: causing a phase synchronizer to generate a second signal on a basis of a first signal received from a communication partner; causing a first modulator to modulate the first signal on a basis of the second signal; and causing a detector to detect that synchronization between the first signal and the second signal is lost.

A communication system according to an embodiment of the disclosure includes a first communication device and a second communication device. The first communication device transmits a first signal. The second communication device includes a phase synchronizer, a first modulator, and a detector. The phase synchronizer generates a second signal on a basis of a first signal received from the first communication device. The first modulator is able to modulate the first signal on a basis of the second signal. The detector detects that synchronization between the first signal and the second signal is lost.

According to the communication device, the communication method, and the communication system in respective embodiments of the disclosure, the phase synchronizer generates the second signal on the basis of the first signal received from the communication partner. On the basis of this second signal, the first signal is modulated. In this situation, detection is made whether the synchronization between the first signal and the second signal is lost.

According to the communication device, the communication method, and the communication system in the respective embodiments of the disclosure, detection is made whether the synchronization between the first signal and the second signal is lost, thus making it possible to enhance a communication quality. It is to be noted that the effects described here are not necessarily limited thereto, and may be any of effects described in the disclosure.

BRIEF DESCRIPTION OF DRAWINGS

FIG. 1 is a block diagram illustrating an example of a configuration of a communication system according to a first embodiment of the disclosure.

FIG. 2 is a block diagram illustrating an example of a configuration of a phase synchronizer illustrated in FIG. 1.

FIG. 3 is a block diagram illustrating an example of a configuration of a synchronization detector illustrated in FIG. 1.

FIG. 4 is an explanatory schematic diagram of a concept of an active load modulation.

FIG. 5 is a timing waveform diagram illustrating an example of an operation of a communication device illustrated in FIG. 1.

FIG. 6 is a timing waveform diagram illustrating another example of the operation of the communication device illustrated in FIG. 1.

FIG. 7 is a timing waveform diagram illustrating another example of the operation of the communication device illustrated in FIG. 1.

FIG. 8 is a characteristic diagram illustrating an example of a characteristic of the communication device illustrated in FIG. 1.

FIG. 9 is a flowchart of an example of an operation of the communication system illustrated in FIG. 1.

FIG. 10 is a timing diagram illustrating an example of the operation of the communication system illustrated in FIG. 1.

FIG. 11 is a timing diagram illustrating another example of the operation of the communication system illustrated in FIG. 1.

FIG. 12 is a block diagram illustrating an example of a configuration of a communication system according to a modification example of the first embodiment.

FIG. 13 is a block diagram illustrating an example of the configuration of the communication system according to the modification example of the first embodiment.

FIG. 14 is a block diagram illustrating an example of a configuration of a synchronization detector illustrated in FIG. 1.

FIG. 15 is a block diagram illustrating an example of a configuration of a communication system according to a second embodiment.

FIG. 16 is a flowchart of an example of an operation of the communication system illustrated in FIG. 15.

FIG. 17 is a flowchart of an example of an operation of the communication system according to a modification example of the second embodiment.

MODES FOR CARRYING OUT THE INVENTION

Some embodiments of the disclosure are described below in detail with reference to the accompanying drawings. The description is given in the following order.
1. First Embodiment
2. Second Embodiment

1. First Embodiment

Configuration Example

FIG. 1 illustrates an example of a configuration of a communication system 1 including communication devices according to a first embodiment. The communication system 1 conducts communication in accordance with the near field communication. It is to be noted that a communication method according to an embodiment of the disclosure is also embodied by the present embodiment, and thus is described together. The communication system 1 includes a communication device 10 and a communication device 20.

The communication device 10 and the communication device 20 communicate with each other through a magnetic field. In the communication system 1, specifically, a coil 15 in the communication device 10 is coupled to a coil 21 in the communication device 20 through a magnetic field, thereby transmitting or receiving data by means of electromagnetic induction. The coils 15 and 21 are described later. In this situation, the communication device 10 transmits data to the communication device 20 by means of an ASK modulation, and the communication device 20 transmits data to the communication device 10 by means of a so-called active load modulation. The communication device 10 may be applied to a reader-writer, for example, and the communication device 20 may be applied to a card, for example.

The communication device 10 includes a carrier signal generator 11, a data generator 12, a modulator 13, an amplifier 14, a coil 15, a capacitor 16, and a demodulator 17.

The carrier signal generator 11 generates a carrier signal. The carrier signal may have a frequency of about 13.56 MHz, for example. The data generator 12 generates data D1 to be transmitted.

The modulator 13 ASK-modulates the carrier signal by using the data D1, thereby generating a signal SIG11.

The amplifier 14 generates a signal SIG12 on the basis of the signal SIG11, and then outputs this signal SIG12 as an inter-terminal signal between a first output terminal and a second output terminal. A first output terminal of the amplifier 14 is coupled to a first end of the coil 15 and to a first end of the capacitor 16. A second output terminal of the amplifier 14 is coupled to a second end of the coil 15 and to a second end of the capacitor 16.

The coil 15 generates a magnetic field on the basis of the signal SIG12 and is to be coupled to the coil 21, described later, in the communication device 20 through the magnetic field. The first terminal of the coil 15 is coupled to both the first output terminal of the amplifier 14 and the first end of the capacitor 16. The second terminal of the coil 15 is coupled to both the second output terminal of the amplifier 14 and the second end of the capacitor 16. The first end of the capacitor 16 is coupled to both the first end of the coil 15 and the first output terminal of the amplifier 14. The second end of the capacitor 16 is coupled to both the second end of the coil 15 and the second output terminal of the amplifier 14.

The demodulator 17 performs a demodulation operation on the basis of a signal at the second end of the coil 15, thereby receiving data D2 transmitted from the communication device 20. The demodulator 17 may be configured using a so-called in-phase/quadrature (I/Q) demodulator, for example. In the communication system 1, the communication device 20 conducts communication by means of a load modulation when transmitting data to the communication device 10. Specifically, during the period in which the communication device 10 transmits the carrier signal to the communication device 20, a communication controller 28, described later, in the communication device 20 varies a load viewed from the communication device 10 in accordance with the data D2 to be transmitted. This variation in the load emerges, for example, as a variation in an amplitude or phase of a voltage signal at the second end of the coil 15 in the communication device 10. The demodulator 17 detects the amplitude or phase of the voltage signal at the second end of the coil 15, thereby receiving the data D2 transmitted from the communication device 20. Then, the demodulator 17 supplies the data D2 to another block in the communication device 10.

In this example, the demodulator 17 operates on the basis of the signal at the second end of the coil 15; however, the operation of the demodulator 17 is not limited thereto. As an alternative example, the demodulator 17 may operate on the basis of a signal at the first end of the coil 15 or on the basis of a signal across the coil 15.

The communication device 20 includes the coil 21, a capacitor 22, a phase synchronizer 30, amplifiers 24A and 24B, switches 23A and 23B, a data generator 27, the communication controller 28, a synchronization detector 40, and a demodulator 26.

The coil 21 is to be coupled to the coil 15 in the communication device 10 through the magnetic field. The coil 21 generates a signal SIG21 corresponding to the signal SIG12 in the communication device 10, by means of electromagnetic induction. A first end of the coil 21 is coupled to both a first end of the capacitor 22 and a first end of the switch 23A, whereas a second end of the coil 21 is coupled to both a second end of the capacitor 22 and a first end of the switch 23B. The first end of the capacitor 22 is coupled to both the first end of the coil 21 and the first end of the switch 23A, whereas the second end of the capacitor 22 is coupled to both the second end of the coil 21 and a first end of the switch 23B.

The phase synchronizer 30 generates a signal SIG30 on the basis of a signal Sin at the second end of the coil 21. The phase synchronizer 30 is configured using a phase locked loop (PLL).

FIG. 2 illustrates an example of a configuration of the phase synchronizer 30. The phase synchronizer 30 includes a phase frequency detector (PFD) 31, a charge pump 32, a loop filter 33, and a voltage controlled oscillator (VCO) 34. The PFD 31 compares a phase of the signal Sin and a phase of the signal SIG30 outputted from the VCO 34 with each other. The charge pump 32 selectively supplies a current to the loop filter 33 or sinks current from the loop filter 33 on the basis of a comparison result of the PFD 31. The loop filter 33 specifies a loop response characteristic of the phase synchronizer 30. The input terminal of the loop filter 33 is coupled to the output terminal of the charge pump 32, whereas the output terminal of the loop filter 33 is coupled to an input terminal of the VCO 34. The VCO 34 oscillates at a frequency corresponding to an output voltage of the loop filter 33, thereby generating the signal SIG30.

The amplifier 24A, illustrated in FIG. 1, amplifies the signal SIG30, and then outputs the amplified signal. The amplifier 24B inverts and amplifies the signal SIG30, and then outputs the inverted amplified signal.

The first end of the switch 23A is coupled to both the first end of the coil 21 and the first end of the capacitor 22, whereas a second end of the switch 23A is coupled to an output terminal of the amplifier 24A. The first end of the switch 23B is coupled to both the second end of the coil 21 and the second end of the capacitor 22, whereas a second end of the switch 23B is coupled to an output terminal of the amplifier 24B. Each of the switches 23A and 23B turns on or off on the basis of a modulation control signal CTL1.

With the above configuration, the communication device 20 turns on or off the switches 23A and 23B on the basis of the modulation control signal CTL1, thereby performing the active load modulation.

The data generator 27 generates the data D2 to be transmitted, and then supplies the data D2 to the communication controller 28.

The communication controller 28 generates the modulation control signal CTL1 on the basis of the data D2. Then, the communication controller 28 supplies this modulation control signal CTL1 to the switches 23A and 23B as well as to the synchronization detector 40. Furthermore, the communication controller 28 also has a function of stopping generating the modulation control signal CTL1 on the basis of a detection signal DET.

The synchronization detector 40 detects whether synchronization is lost, on the basis of the signal Sin, the signal SIG30, and the modulation control signal CTL1.

FIG. 3 illustrates an example of a configuration of the synchronization detector 40. The synchronization detector 40 includes a phase detector 41, a counter section 42, and a latch section 43.

The phase detector 41 detects whether a phase difference between the phase of the signal Sin and the phase of the signal SIG30 is equal to or more than a predetermined amount. Then, the phase detector 41 outputs this detection result as a signal SIG41. Specifically, in a case where the phase difference is less than the predetermined amount, the phase detector 41 deasserts the signal SIG41. In a case where the phase difference is equal to or more than the predetermined amount, the phase detector 41 asserts the signal SIG41. This predetermined amount may be set to 90 degrees, for example. The phase detector 41 also has a function of resetting the detection result on the basis of the modulation control signal CTL1. Specifically, the phase detector 41 resets the detection result during a period other than a modulation period in which the switches 23A and 23B are in an ON state, thus deasserting the signal SIG41.

The counter section 42 uses pulses in the signal SIG30 to count a length of a period in which the signal SIG41 is asserted. Then, the counter section 42 outputs this count result as the signal SIG42. Furthermore, the counter section 42 also has a function of resetting the count result during a period other than the modulation period, on the basis of the modulation control signal CTL1.

When the count result indicated by the signal SIG42 is equal to or more than a preset value, the latch section 43 asserts the detection signal DET. Furthermore, the latch section 43 resets the latched result during a period other than the modulation period, on the basis of the modulation control signal CTL1, thus deasserting the detection signal DET.

With this configuration, when the synchronization detector 40 successively detects, a predetermined number of times, that the phase difference between the phase of the signal Sin and the phase of the signal SIG30 is equal to or more than the predetermined amount within the modulation period, the synchronization detector 40 determines that the synchronization is lost. Then, the synchronization detector 40 asserts the detection signal DET.

The demodulator 26, illustrated in FIG. 1, performs a demodulation operation on the basis of the signal Sin at the second end of the coil 21, thereby receiving the data D1 transmitted from the communication device 10. The demodulator 26 may be configured using an ASK demodulator. Then, the demodulator 26 supplies the data D1 to another block in the communication device 20.

In this example, the phase synchronizer 30, the synchronization detector 40, and the demodulator 26 operate on the basis of the signal Sin at the second end of the coil 21; however, the operations of the phase synchronizer 30, the synchronization detector 40, and the demodulator 26 are not limited thereto. As an alternative example, the phase synchronizer 30, the synchronization detector 40, and the demodulator 26 may operate on the basis of the signal at the first end of the coil 21 or on the basis of the signal across the coil 21.

Herein, the communication device 20 may correspond to a specific example of a "communication device" in an embodiment of the disclosure. The amplifiers 24A and 24B and the switches 23A and 23B may correspond to a specific example of a "first modulator" in an embodiment of the disclosure. The synchronization detector 40 may correspond to a specific example of a "detector" in an embodiment of the disclosure. The communication controller 28 may correspond to a specific example of a "controller" in an embodiment of the disclosure.

[Operation and Workings]

Next, a description is given of an operation and workings of the communication system 1 in the present embodiment.

[Summary of Overall Operation]

First, the summary of an overall operation of the communication system 1 is described with reference to FIG. 1.

The communication device 10 performs the ASK modulation to transmit the data D1 to the communication device 20. Specifically, in the communication device 10, first, the carrier signal generator 11 generates the carrier signal, and the data generator 12 generates the data D1 to be transmitted. The modulator 13 ASK-modulates the carrier signal by using the data D1, thereby generating the signal SIG1. The amplifier 14 generates the signal SIG12 on the basis of the signal SIG11. The coil 15 generates a magnetic field on the basis of the signal SIG12. In the communication device 20, the coil 21 generates the signal SIG21 on the basis of the magnetic field generated by the coil 15. The demodulator 26 performs the demodulation operation on the basis of the signal Sin at the second end of the coil 21, thereby receiving the data D1 transmitted from the communication device 10.

The communication device 20 performs the active load modulation to transmit the data D2 to the communication device 10. Specifically, first, the phase synchronizer 30 generates the signal SIG30 on the basis of the signal Sin during the period in which the communication device 10 transmits the carrier signal to the communication device 20. The communication controller 28 generates the modulation control signal CTL1 on the basis of the data D2. The synchronization detector 40 detects whether the synchronization is lost, on the basis of the signal Sin, the signal SIG30, and the modulation control signal CTL1, and then generates the detection signal DET. In a case where the synchronization is lost, the communication controller 28 stops generating the modulation control signal CTL1, on the basis of the detection signal DET. The amplifier 24A amplifies the signal SIG30 outputted from the phase synchronizer 30, and then outputs the amplified signal. The amplifier 24B inverts and amplifies the signal SIG30 outputted from the phase synchronizer 30, and then outputs the inverted amplified signal. Each of the switches 23A and 23B turns on or off on the basis of the modulation control signal CTL1. This causes the load viewed from the communication device 10 to vary on the basis of the data D2. The demodulator 17 in the communication device 10 performs the demodulation operation on the basis of the signal at the second end of the coil 15, thereby receiving the data D2 transmitted from the communication device 20.

(Concerning Active Load Modulation]

The communication device 20 performs a so-called active load modulation to transmit the data D2 to the communication device 10. Details of this active load modulation are described below.

In the active load modulation, the communication controller 28 turns on or off the switches 23A and 23B in accordance with the data D2 during the period in which the communication device 10 transmits the carrier signal to the communication device 20. When both the switches 23A and 23B are in the ON state, the signal outputted from the amplifier 24A is supplied to the first end of the coil 21, and the signal outputted from the amplifier 24B is supplied to the second end of the first end of the coil 21. The coil 21 thereby generates the magnetic field. In this way, in the active load modulation, the coil 21 in the communication device 20 generates the magnetic field during the period in which the communication device 10 transmits the carrier signal to the communication device 20, thereby enabling the magnetic field to be greatly varied, thus making it possible to vary the load viewed from the communication device 10. On the basis of the varied load, the demodulator 17 in the communication device 10 performs the demodulation operation, thereby receiving the data D2 transmitted from the communication device 20. Consequently, for example, it is possible to extend a distance of communication conducted by the communication system 1 or to downsize antennas, such as the coils 15 and 21.

FIG. 4 schematically illustrates an operation in the active load modulation. The coil 15 in the communication device 10 generates a magnetic field on the basis of a carrier signal W1. The coil 21 in the communication device 20 generates a magnetic field on the basis of a signal W2 that is synchronized with the carrier signal, during the period in which the switches 23A and 23B are in the ON state. Then, the demodulator 17 in the communication device 10 performs the demodulation operation on the basis of a synthesized signal W3 generated from the carrier signal W1 and the signal W2. This synthesized signal W3 is expressed as follows:

$$A \sin(\omega t)+B \sin(\omega t+\theta)=\sqrt{A^2+B^2+2AB\cos\theta} \sin(\theta+\phi) \tag{1}$$

where the first term in the left side expresses the carrier signal W1, and the second term in the left side expresses the signal W2. In this way, the synthesized signal W3 is expressed by a composition theorem of sinusoidal waves. The amplitude of the synthesized signal W3 varies in accordance with an amplitude A of the carrier signal W1 and an amplitude B and phase θ of the signal W2. Hereinafter, a description is given, as examples, of specific examples of operations in Case C1 where the synthesized signal W3 has a smaller amplitude, and in Case C2 where the synthesized signal W3 has a greater amplitude.

FIG. 5 illustrates an example of an operation of the communication device 20 in Case C1. (A) of FIG. 5 illustrates a waveform of the modulation control signal CTL1, (B) of FIG. 5 illustrates a waveform of the signal SIG30, and (C) of FIG. 5 illustrates a waveform of the signal Sin. In this example, during a modulation period P1, which is the period in which the modulation control signal CTL1 is at a High level, the switches 23A and 23B are in the ON state, and the communication device 20 performs the active load modulation. In this situation, the amplitude of the signal Sin in this modulation period P1 is smaller than an amplitude in a period other than the modulation period P1. That is, this example corresponds to the example of FIG. 4 in which the carrier signal W1 and the signal W2 cancel each other, thus decreasing the amplitude of the synthesized signal W3.

In a case where the amplitude of the signal Sin decreases as described above, the synchronization may be lost in the phase synchronizer 30. In this case, specifically, the PFD 31 in the phase synchronizer 30 fails to detect a transition of the signal Sin due to the small amplitude of the signal Sin, thereby making it difficult to perform an operation of the phase comparison. As a result, an output voltage of the loop filter 33 is gradually away from a desired voltage. Consequently, as illustrated in FIG. 6, a frequency of the signal SIG30 deviates from a desired frequency, thus leading to a possibility that the synchronization may be lost.

FIG. 7 illustrates an example of an operation of the communication device 20 in Case C2. In this example, the amplitude of the signal Sin in the modulation period P1 is greater than the amplitude in the period other than the modulation period P1. That is, this example corresponds to the example of FIG. 4 in which the contribution of the signal W2 becomes greater because of the signal W2 being greater than the carrier signal W1, thus increasing the amplitude of the synthesized signal W3.

Even in a case where the amplitude of the signal Sin is greater, there is a possibility that the synchronization may be lost in the phase synchronizer 30, as described above. In this case, specifically, the phase synchronizer 30 attempts to perform an operation of phase synchronization on the basis of the signal Sin according to the signal SIG30 generated by the phase synchronizer 30 itself. Thus, the output voltage of the loop filter 33 is gradually away from a desired voltage in accordance with the phase difference between the phase of the signals Sin and the phase of the SIG30. Consequently, a frequency of the signal SIG30 deviates from a desired frequency, thus leading to a possibility that the synchronization may be lost, as in Case C1.

There are cases where a synchronization loss, as described above, may occur in the phase synchronizer 30, for example when the communication distance between the communication device 10 and the communication device 20 is long.

FIG. 8 illustrates an example of a characteristic of the communication system 1. In this example, a communicable distance Lask by the ASK modulation is 200 mm, and a communicable distance Lalm by the load modulation is 50 mm. That is, in a case where the distance between the communication device 10 and the communication device 20 is equal to or less than 200 mm, the communication device 10 is able to transmit the data D2 to the communication device 20. In a case where the distance between the communication device 10 and the communication device 20 is equal to or less than 50 mm, the communication device 20 is able to transmit the data D2 to the communication device 10. As described above, in a communication system that conducts the near field communication, it is often the case that the communicable distance Lalm by the load modulation may be shorter than the communicable distance Lask by the ASK modulation.

In the above example, a synchronization loss occurs in the phase synchronizer 30 when the distance between the communication device 10 and the communication device 20 is in a range from about 100 mm to about 180 mm, as indicated by a distance L1 at which a synchronization loss occurs. That is, in such a distance, the communication device 10 performs the ASK modulation to transmit the data D1 to the communication device 20, and then the communication device 20 is able to receive the data D1. The communication device 20 attempts to respond to the data D1 by means of the load modulation. In this situation, the amplitude of the carrier signal received by the communication device 20 may decrease due to the long distance between the communication device 10 and the communication device 20. As a result, as in the above-described Case C2, illustrated in FIG. 7, for example, the signal Sin may decrease, thus leading to a possibility that a synchronization loss may occur.

For example, in a case where a user gradually brings a card equipped with the communication device 20 closer to a reader-writer equipped with the communication device 10, there is a possibility that the communication device 20 may attempts to transiently transmit the data D2 with the synchronization being lost. In this case, the frequency of a radio signal in use may deviate from a frequency band available for the near field communication, thus leading to possibility that the near field communication specification may not be satisfied.

Therefore, in the communication device 20, the synchronization detector 40 detects whether the synchronization is lost. In a case where the synchronization is lost, the communication controller 28 stops generating the modulation control signal CTL1. In other words, the communication device 20 does not perform the active load modulation in a case where the frequency of the signal SIG30 deviates from a desired frequency. This makes it possible to reduce a possibility that the communication system 1 may conduct communication using a signal whose frequency deviates from a frequency band available in the near field communication. Consequently, it is possible to prevent the communication system 1 from outputting any unnecessary radio signal, thus enhancing a communication quality.

(Detailed Operation)

FIG. 9 illustrates an example of an operation of the communication system 1. In the communication system 1, first, the communication device 10 transmits the data D1 to the communication device 20. In turn, the communication device 20 responds to this by transmitting the data D2 to the communication device 10. In this situation, the communication device 20 detects whether the synchronization is lost in the phase synchronizer 30. Details of this operation are described below.

First, at step S1, the communication device 10 performs the ASK modulation to transmit the data D1 to the communication device 20.

Next, at step S2, the demodulator 26 in the communication device 20 checks whether the data D1 is received. In a case where the demodulator 26 receives the data D1, the data generator 27 in the communication device 20 generates the data D2 in order to respond to the communication device 10. Then, the operation proceeds to step S3. In a case where the demodulator 26 is not able to receive the data D1, the operation returns to step S1, and steps S1 and S2 are repeated until the data D1 is received.

Next, at step S3, the communication device 20 performs the active load modulation to start transmitting the data D2. Specifically, first, the data generator 27 starts generating the data D2. Then, the communication controller 28 starts generating the modulation control signal CTL1 on the basis of the data D2. On the basis of this modulation control signal CTL1, the switches 23A and 23B start turning ON or OFF state.

Next, at step S4, the synchronization detector 40 checks whether the synchronization is lost, on the basis of the signal Sin and the signal SIG30.

In a case where the synchronization is not lost at step S4, namely, in a case of "N" at step S4, the communication controller 28 checks, at step S5, whether the transmission has been completed. In a case where the transmission has not yet been completed, namely, in a case of "N" at step S5, the operation returns to step S4. In other words, the synchronization detector 40 repeats checking whether the synchronization is lost until the transmission is completed. In a case where the transmission has been completed, namely, in a case of "Y" at step S5, the operation is concluded.

In a case where the synchronization is lost at step S4, namely, in a case of "Y" at step S4, the communication device 20 stops transmitting the data D2 at step S6. Specifically, the communication controller 28 stops generating the modulation control signal CTL1. The switches 23A and 23B are thereby brought into the OFF state. Then, the operation is concluded. After a certain amount of time has passed, the phase synchronization is achieved in the phase synchronizer 30.

In the communication system 1, as described above, the synchronization detector 40 repeats detecting whether the synchronization is lost while the data D2 is transmitted. In a case where the synchronization is lost, the communication controller 28 stops generating the modulation control signal CTL1. This makes it possible to reduce the possibility that the communication system 1 may conduct communication using a signal whose frequency deviates from a frequency band available in the near field communication. Consequently, it is possible to prevent the communication system 1 from outputting any unnecessary radio signal, thus enhancing a communication quality.

In the communication system 1, the communication device 10 and the communication device 20 transmit and receive data to and from each other, for example, a plurality of times. Such a process of transmitting and receiving data is described below by exemplifying two examples of the cases where the synchronization is not lost and where the synchronization is lost.

FIG. 10 illustrates an example of an operation of the communication system 1 in the case where the synchronization is not lost. (A) of FIG. 10 illustrates the communication of the data D1, (B) of FIG. 10 illustrates the communication of the data D2, (C) of FIG. 10 illustrates a waveform of the modulation control signal CTL1, and (D) of FIG. 10 illustrates a waveform of the detection signal DET. This example represents a case where the card equipped with the communication device 20 is located close to the reader-writer equipped with the communication device 10. In this example, the High level of the detection signal DET indicates the assertion, and the Low level of the detection signal DET indicates the deassertion.

During a period between timings t11 and t12, the communication device 10 transmits the data D1 to the communication device 20, as illustrated in (A) of FIG. 10. In turn, the demodulator 26 in the communication device 20 receives the data D1.

Next, during a period between timings t13 and t14, the communication device 20 makes a response. Specifically, the communication controller 28 generates the modulation control signal CTL1 on the basis of the data D2 generated by the data generator 27, as illustrated in (C) of FIG. 10. That is, in this example, the synchronization is not lost in the phase synchronizer 30. Therefore, the synchronization detector 40 maintains the detection signal DET at the Low level, namely, deasserts the detection signal DET, and the communication controller 28 generates the modulation control signal CTL1, as described above. The switches 23A and 23B thereby turn on or off on the basis of the modulation control signal CTL1. In this way, the communication device 20 transmits the data D2 to the communication device 10, as illustrated in (B) of FIG. 10. In turn, the demodulator 17 in the communication device 10 receives the data D2.

The communication system 1 performs data transmission and data reception by repeating the operations as illustrated in FIG. 10 a plurality of times.

FIG. 11 illustrates an example of an operation of the communication system 1 in the case where the synchronization is lost. This example represents a case where a user gradually brings the card equipped with the communication device 20 closer to the reader-writer equipped with the communication device 10.

During a period between timings t21 and t22, the communication device 10 transmits the data D1 to the communication device 20, as illustrated in (A) of FIG. 11. In turn, the demodulator 26 in the communication device 20 receives the data D1.

Next, at timing t23, the communication device 20 starts making a response. Specifically, the communication controller 28 starts generating the modulation control signal CTL1 on the basis of the data D2 generated by the data generator 27, as illustrated in (C) of FIG. 11. The communication device 20 thereby starts transmitting the data D2 to the communication device 10, as illustrated in (B) of FIG. 11.

In this example, the amplitude of the signal Sin decreases, because the distance between the communication device 10 and the communication device 20 is long. As a result, the synchronization is lost in the phase synchronizer 30, as in Case C2 illustrated in FIG. 7. Thus, the synchronization detector 40 detects this synchronization loss, and, at timing t24, changes the detection signal DET from the Low level to the High level, namely, asserts the detection signal DET, as illustrated in (D) of FIG. 11. At timing t25, the communication controller 28 stops generating the modulation control signal CTL1 on the basis of the detection signal DET, as illustrated in (C) of FIG. 11. As a result, the communication device 20 stops transmitting the data D2, as illustrated in (B) of FIG. 11. During a period between timings t23 and t25, the demodulator 17 in the communication device 10 receives the data D2.

During a period between timings t26 and t27, the communication device 10 transmits the data D1 to the communication device 20, as illustrated in (A) of FIG. 11. In turn, the demodulator 26 in the communication device 20 receives the data D1.

During a period between timings t28 and t29, the communication device 20 makes a response. In this example, the distance between the communication device 10 and the communication device 20 is short, and therefore the amplitude of the signal Sin increases. Accordingly, the phase synchronizer 30 performs the operation of phase synchronization, thus eliminating the synchronization loss. As a result, the synchronization detector 40 maintains the detection signal DET at the Low level, namely, deasserts the detection signal DET. The communication controller 28 thereby generates the modulation control signal CTL1. In this way, the communication device 20 transmits the data D2 to the communication device 10, as illustrated in (B) of FIG. 11. In turn, the demodulator 17 in the communication device 10 receives the data D2.

As described above, the communication system 1 stops transmitting the data D2 by means of the active load modulation in the case where the synchronization is lost. This enables the modulation period to be shortened, thus allowing the phase synchronizer 30 to perform the operation of phase synchronization thereafter, making it possible to ensure a time to eliminate the synchronization loss. Consequently, the communication system 1 reduces the possibility that the synchronization may be lost when the communication device 20 performs the active load modulation next time, thus making it possible to enhance a communication quality.

[Effects]

In the present embodiment, as described above, detection is made whether the synchronization is lost during data transmission by means of the active load modulation. In the case where synchronization is lost, the generation of the modulation control signal is stopped. This makes it possible to reduce the possibility that communication may be conducted using a signal whose frequency deviates from a frequency band available in the near field communication. Consequently, it is possible to prevent the communication system 1 from outputting any unnecessary radio signal, thus enhancing a communication quality. Consequently, it is possible to prevent any unnecessary radio signal from being outputted, thus enhancing a communication quality.

According to the foregoing embodiment, in a case where synchronization is lost, the transmission of the data D2 by means of the active load modulation is stopped. This makes it possible to ensure a time to eliminate the synchronization loss, thus enhancing a communication quality.

Modification Example 1-1

In the foregoing embodiment, the synchronization detector 40 detects whether the synchronization is lost by comparing the phase of the signal Sin and the phase of the signal SIG30 with each other; however, the detection method is not limited thereto. As an alternative example, the synchronization detector 40 may compare the numbers of pulses in the signal Sin and the signal SIG30 to detect whether the synchronization is lost, on the basis of the degree to which the numbers of the pulses coincide with each other.

Modification Example 1-2

In the foregoing embodiment, the synchronization detector 40 detects whether the synchronization is lost, on the basis of the signal Sin and the signal SIG30; however, the detection method is not limited thereto. As an alternative example, detection may be made whether the synchronization is lost, without using the signal Sin, as with a synchronization detector 40A illustrated in FIG. 12. A communication system 1A illustrated in FIG. 12 includes a communication device 20A, and this communication device 20A includes the synchronization detector 40A. The synchronization detector 40A detects whether the synchronization is lost, by counting the number of pulses in the signal SIG30 over a preset length of time. That is, the frequency of the carrier signal transmitted by the communication device 10 is known. Thus, it is possible to detect whether the synchronization is lost, on the basis of the frequency of the signal SIG30. For example, the synchronization detector 40A may have a crystal oscillator, etc., to acquire the above preset length of time on the basis of its oscillation signal.

Modification Example 1-3

In the foregoing embodiment, the synchronization detector 40 detects whether the synchronization is lost during the modulation period; however, the detection method is not limited thereto. Hereinafter, a communication system 1B according to the present modification example is described.

FIG. 13 illustrates an example of a configuration of the communication system 1B according to the present modification example. The communication system 1B includes a communication device 20B. This communication device 20B includes a synchronization detector 40B and a communication controller 28B. The synchronization detector 40B detects whether the synchronization is lost, on the basis of the signal Sin and the signal SIG30. That is, the synchronization detector 40 according to the foregoing embodiment detects whether the synchronization is lost, on the basis of the signal Sin, the signal SIG30, and the modulation control signal CTL1. In contrast, the synchronization detector 40B detects whether the synchronization is lost, on the basis of the signal Sin and the signal SIG30.

FIG. 14 illustrates an example of a configuration of the synchronization detector 40B. The synchronization detector 40B includes a phase detector 41B, a counter section 42B, and a latch section 43B. The phase detector 41B, the counter section 42B, and the latch section 43B are equivalent to, respectively, the phase detector 41, the counter section 42, and the latch section 43 according to the foregoing embodiment, except that the reset function based on the modulation control signal CTL1 is removed from the latter.

The communication controller 28B generates the modulation control signal CTL1 on the basis of the data D2, and then supplies this modulation control signal CTL1 to switches 23A and 23B. Furthermore, the communication controller 28B also has a function of stopping generating the modulation control signal CTL1, on the basis of the detection signal DET, during the modulation period.

With this configuration, the synchronization detector 40B constantly detects whether the synchronization is lost, independently of the modulation period. When the detection signal DET is asserted during the modulation period, the communication controller 28B stops generating the modulation control signal CTL1. This configuration also makes it possible to achieve similar effects as those in the foregoing embodiment.

2. Second Embodiment

Next, a communication system 2 according to a second embodiment is described. The present embodiment is configured to be able to also perform a passive load modulation in addition to the active load modulation. Same reference numerals are assigned to components substantially the same as those in the communication system 1 according to the foregoing first embodiment, and descriptions thereof are omitted as appropriate.

FIG. 15 illustrates an example of a configuration of the communication system 2 according to the present embodiment. The communication system 2 includes a communication device 60. The communication device 60 includes a switch 63, a resistive element 64, and a communication controller 68.

A first end of the switch 63 is coupled to the first end of the coil 21, whereas a second end of the switch 63 is coupled to a first end of the resistive element 64. This switch 63 turns on or off on the basis of a modulation control signal CTL2. The first end of the resistive element 64 is coupled to the second end of the switch 63, whereas a second end of the resistive element 64 is grounded. With this configuration, the communication device 60 turns on or off the switch 63, thereby performing the passive load modulation.

The communication controller 68 generates the modulation control signal CTL1 and the modulation control signal CTL2 on the basis of the data D2. Then, the communication controller 68 supplies the modulation control signal CTL1 to the switches 23A and 23B and supplies the modulation control signal CTL2 to the switch 63. Furthermore, the communication controller 68 supplies a control signal CTLA to the synchronization detector 40. The communication controller 68 causes the synchronization detector 40 to detect whether the synchronization is lost during the modulation period P1 in which the active load modulation is performed, as well as a modulation period in which the passive load modulation is performed and a predetermined period before the data D2 is transmitted. The communication controller 68 also has a function of selecting one of the active load modulation and the passive load modulation on the basis of the detection signal DET.

In this example, the synchronization detector 40 detects whether the synchronization is lost during a period specified by the control signal CTLA; however, the detection method is not limited thereto. Alternatively, the synchronization detector 40 may constantly detect whether the synchronization is lost, as in Modification Example 1-3 of the foregoing first embodiment. In this case, the communication controller 68 may select one of the active load modulation and the passive load modulation, on the basis of the detection signal DET, during the modulation period P1 in which the active load modulation is performed, the modulation period in which the passive load modulation is performed, and the predetermined period before the data D2 is transmitted.

FIG. 16 illustrates an example of an operation of the communication system 2.

As is the case of the communication system 1 illustrated in FIG. 9, first the communication device 10 performs the ASK modulation to transmit data D1 to the communication device 60 at step S1, and then the demodulator 26 in the communication device 60 checks, at step S2, whether the data D1 is received.

Next, at step S11, the synchronization detector 40 checks whether the synchronization is lost, on the basis of signal Sin and the signal SIG30.

In a case where the synchronization is not lost at step S11, namely, in a case of "N" at step S11, the communication device 60 performs the active load modulation to start transmitting the data D2, at step S12. Specifically, the data generator 27 starts generating the data D2, and the communication controller 68 starts generating the modulation control signal CTL1 on the basis of the data D2. On the basis of this modulation control signal CTL1, the switches 23A and 23B start turning on or off.

In a case where the synchronization is lost at step S11, namely, in a case of "Y" at step S11, the communication device 60 performs the passive load modulation to start transmitting the data D2, at step S13. Specifically, first, the data generator 27 starts generating the data D2, and the communication controller 68 starts generating the modulation control signal CTL2 on the basis of the data D2. On the basis of this modulation control signal CTL2, the switch 63 starts turning on or off.

Next, at step S14, the synchronization detector 40 checks whether the synchronization is lost, on the basis of the signal Sin and the signal SIG30.

In a case where the synchronization is not lost at step S14, namely, in a case of "N" at step S14, when the communication is conducted by means of the passive load modulation, the communication device 60 switches the passive load modulation to the active load modulation at step S15. Specifically, the communication controller 68 stops generating the modulation control signal CTL2, and generates the modulation control signal CTL1 on the basis of the data D2. On the basis of this modulation control signal CTL1, the switches 23A and 23B turn on or off. In a case where the communication is conducted by means of the active load modulation, the communication device 60 continues to conduct the communication by means of the active load modulation without any change.

In a case where the synchronization is lost at step S14, namely, in a case of "Y" at step S14, when the communication is conducted by means of the active load modulation, the communication device 60 switches the active load modulation to the passive load modulation, at step S16. Specifically, the communication controller 68 stops generating the modulation control signal CTL1, and generates the modulation control signal CTL2 on the basis of the data D2. On the basis of this modulation control signal CTL2, the switch 63 turns on or off. In a case where the communication is conducted by means of the passive load modulation, the communication device 60 continues to conduct the communication by means of the passive load modulation without any change.

Next, at step S17, the communication controller 68 checks whether the transmission has been completed. In a case where the transmission has not yet been completed, namely, in a case of "N" at step S17, the operation returns to step S14. That is, the synchronization detector 40 repeats checking whether the synchronization is lost until the transmission is completed. In a case where the transmission has already been completed, namely, in a case of "Y" at step S17, the operation is concluded.

In the communication system 2, as described above, the communication device 60 switches its modulation scheme from the active load modulation to the passive load modulation, when the synchronization is lost in a case where the data D2 is transmitted by means of the active load modulation. The communication system 2 thereby attempts to transmit the data D2 by means of the passive load modulation even in a case where the synchronization is lost, unlike the communication system 1 according to the first embodiment. This makes it possible to enhance a communication quality.

In the communication system 2, the communication device 60 switches its modulation scheme from the passive load modulation to the active load modulation, when the synchronization loss is eliminated in a case where the data D2 is transmitted by means of the passive load modulation. That is, in a case where the data D2 is transmitted by means of the passive load modulation, phenomena such as those in Cases C1 and C2 are less likely to occur. Therefore, it is highly possible that the synchronization loss in the phase synchronizer 30 may be eliminated. When the synchronization loss is eliminated as described above, the communication system 2 switches the passive load modulation to the active load modulation. This enables the communication system 2 to greatly vary a load viewed from the communication device 10, thus enhancing a communication quality.

[Effects]

In the present embodiment, as described above, when the synchronization is lost in a case where data is transmitted by means of the active load modulation, the modulation scheme is switched from the active load modulation to the passive load modulation. This makes it possible to enhance a communication quality.

In the present embodiment, when synchronization loss is eliminated in a case where data is transmitted by means of the passive load modulation, the modulation scheme is switched from the passive load modulation to the active load modulation. This makes it possible to enhance a communication quality.

Other effects are substantially the same as those in the foregoing first embodiment.

The technology has been described hereinabove using some embodiments and modification examples; however, the technology is not limited to those embodiments and modification examples, and may be modified in a variety of ways.

For example, in the foregoing second embodiment, the communication device 60 checks whether the synchronization is lost after receiving the data D1, and starts the active load modulation or the passive load modulation on the basis of the check result, as in steps S11 to S13 of FIG. 16. However, the operation of the communication device 60 is not limited thereto. As an alternative example, as illustrated in FIG. 17, steps S11 and S13 may be omitted, and the communication device 60 may start the active load modulation after receiving the data D1.

It is to be noted that the effects described herein are merely examples and are not limitative, and may further include other effects.

It is to be noted that the technology may have the following configurations.

(1)

A communication device including:

a phase synchronizer that generates a second signal on a basis of a first signal received from a communication partner;

a first modulator that is able to modulate the first signal on a basis of the second signal; and a detector that detects that synchronization between the first signal and the second signal is lost.

(2)

The communication device according to (1), further including a controller that controls an operation of the first modulator on a basis of a detection result of the detector.

(3)

The communication device according to (2), in which, in a case where the synchronization between the first signal and the second signal is lost during a period of the operation of the first modulator, the controller stops the operation of the first modulator.

(4)

The communication device according to (3), in which the controller synchronizes the first signal and the second signal with each other by stopping the operation of the first modulator.

(5)

The communication device according to any one of (2) to (4), further including a second modulator that is able to modulate the first signal, in which the controller also controls an operation of the second modulator on the basis of the detection result of the detector.

(6)

The communication device according to (5), in which, in a case where the synchronization between the first signal and the second signal is lost during a period of the operation of the first modulator, the controller stops the operation of the first modulator and starts the operation of the second modulator.

(7)

The communication device according to (5) or (6), in which, in a case where the first signal and the second signal are synchronized with each other during a period of the operation of the second modulator, the controller stops the operation of the second modulator and starts the operation of the first modulator.

(8)

The communication device according to any one of (5) to (7), in which in a case where the synchronization between the first signal and the second signal is lost during a period in which neither the first modulator nor the second modulator operates, the controller starts the operation of the second modulator, and in a case where the first signal and the second signal are synchronized with each other during the period in which neither the first modulator nor the second modulator operates, the controller starts the operation of the first modulator.

(9)

The communication device according to any one of (1) to (8), in which the detector detects that the synchronization between the first signal and the second signal is lost by making a comparison between a phase of the first signal and a phase of the second signal.

(10)

The communication device according to (9), in which the detector detects that the synchronization between the first signal and the second signal is lost by successively detecting, a predetermined number of times, that a phase difference between the phase of the first signal and the phase of the second signal is equal to or more than a predetermined amount.

(11)

The communication device according to any one of (1) to (8), in which the detector detects a change in a frequency of the second signal by counting the number of pulses in the second signal.

(12)

The communication device according to any one of (1) to (11), in which the first modulator includes a switch, the phase synchronizer receives the first signal from the communication partner via a coil, and the switch turns on to supply the second signal to the coil.

(13)

A communication method including:

causing a phase synchronizer to generate a second signal on a basis of a first signal received from a communication partner;

causing a first modulator to modulate the first signal on a basis of the second signal; and causing a detector to detect that synchronization between the first signal and the second signal is lost.

(14)

A communication system including:

a first communication device that transmits a first signal; and a second communication device, the second communication device including a phase synchronizer that generates a second signal on a basis of a first signal received from the first communication device, a first modulator that is able to modulate the first signal on a basis of the second signal; and a detector that detects that synchronization between the first signal and the second signal is lost.

This application is based upon and claims the benefit of priority of the Japanese Patent Application No. 2015-142643 filed with the Japan Patent Office on Jul. 17, 2015, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication device comprising:
    a phase synchronizer configured to generate a second signal on a basis of a first signal received from a communication partner;
    a first modulator configured to modulate the first signal on a basis of the second signal;
    a detector configured to detect that synchronization between the first signal and the second signal is lost; and
    a controller configured to control an operation of the first modulator on a basis of a detection result of the detector,
    wherein, in a case where the synchronization between the first signal and the second signal is lost during a period of the operation of the first modulator, the controller is configured to stop the operation of the first modulator.

2. The communication device according to claim 1, wherein the controller is further configured to synchronize the first signal and the second signal with each other by stopping the operation of the first modulator.

3. The communication device according to claim 1, further comprising a second modulator configured to modulate the first signal, wherein the controller is further configured to control an operation of the second modulator on the basis of the detection result of the detector.

4. The communication device according to claim 3, wherein, in the case where the synchronization between the first signal and the second signal is lost during the period of the operation of the first modulator, the controller is further configured to stop the operation of the first modulator and start the operation of the second modulator.

5. The communication device according to claim 3, wherein, in a case where the first signal and the second signal are synchronized with each other during a period of the operation of the second modulator, the controller is further configured to stop the operation of the second modulator and start the operation of the first modulator.

6. The communication device according to claim 3, wherein
in a case where the synchronization between the first signal and the second signal is lost during a period in which neither the first modulator nor the second modulator operates, the controller is further configured to start the operation of the second modulator, and
in a case where the first signal and the second signal are synchronized with each other during the period in which neither the first modulator nor the second modulator operates, the controller is further configured to start the operation of the first modulator.

7. The communication device according to claim 1, wherein, to detect that the synchronization between the first signal and the second signal is lost, the detector is further configured to make a comparison between a phase of the first signal and a phase of the second signal.

8. The communication device according to claim 7, wherein, to detect that the synchronization between the first signal and the second signal is lost, the detector is further configured to successively detect, a predetermined number of times, that a phase difference between the phase of the first signal and the phase of the second signal is equal to or more than a predetermined amount.

9. The communication device according to claim 1, wherein the detector is configured to detect a change in a frequency of the second signal by counting a number of pulses in the second signal.

10. The communication device according to claim 1, wherein
the first modulator includes a switch,
the phase synchronizer is configured to receive the first signal from the communication partner via a coil, and
the switch is configured to turn on to supply the second signal to the coil.

11. A communication method comprising:
generating, with a phase synchronizer, a second signal on a basis of a first signal received from a communication partner;
modulating, with a first modulator, the first signal on a basis of the second signal; and
detecting, with a detector, a synchronization between the first signal and the second signal is lost;
controlling, with a controller, an operation of the first modulator on a basis of a detection result of the detector; and
stopping, with the controller, the operation of the first modulator in a case where the synchronization between the first signal and the second signal is lost during a period of the operation of the first modulator.

12. The communication method according to claim 11, further comprising:
stopping, with the controller, the operation of the first modulator to synchronize the first signal and the second signal with each other.

13. The communication method according to claim 11, further comprising:
controlling, with the controller, an operation of a second modulator on the basis of the detection result of the detector,
wherein the second modulator is configured modulate the first signal.

14. The communication method according to claim 13, further comprising:
stopping, with the controller, the operation of the first modulator in the case where the synchronization between the first signal and the second signal is lost during the period of the operation of the first modulator; and
starting, with the controller, the operation of the second modulator.

15. The communication method according to claim 13, further comprising:
stopping, with the controller, the operation of the second modulator in a case where the first signal and the second signal are synchronized with each other during a period of the operation of the second modulator; and
starting, with the controller, the operation of the first modulator.

16. The communication method according to claim 13, further comprising:
starting, with the controller, the operation of the second modulator in a case where the synchronization between the first signal and the second signal is lost during a period in which neither the first modulator nor the second modulator operates; and
starting, with the controller, the operation of the first modulator in a case where the first signal and the second signal are synchronized with each other during the period in which neither the first modulator nor the second modulator operates.

17. The communication method according to claim 11, further comprising:
comparing, with the detector, a phase of the first signal and a phase of the second signal to detect that the synchronization between the first signal and the second signal is lost.

18. The communication method according to claim 17, further comprising:
successively detecting, with the detector, a predetermined number of times that a phase difference between the phase of the first signal and the phase of the second signal is equal to or more than a predetermined amount to detect that the synchronization between the first signal and the second signal is lost.

19. The communication method according to claim 11, further comprising:
counting, with the detector, a number of pulses in the second signal to detect a change in a frequency of the second signal.

20. A communication system comprising:
a first communication device that transmits a first signal; and
a second communication device including
a phase synchronizer that generates a second signal on a basis of the first signal received from the first communication device,
a first modulator that is able to modulate the first signal on a basis of the second signal; and
a detector that detects that synchronization between the first signal and the second signal is lost; and a controller that controls an operation of the first modulator on a basis of a detection result of the detector, wherein, in a case where the synchronization between the first signal and the second signal is lost during a period of the operation of the first modulator, the controller stops the operation of the first modulator.

21. The communication system according to claim 20, wherein the controller is further configured to synchronize the first signal and the second signal with each other by stopping the operation of the first modulator.

22. The communication system according to claim 20, wherein the second communication device further includes a second modulator configured to modulate the first signal, wherein the controller is further configured to control an operation of the second modulator on the basis of the detection result of the detector.

23. The communication system according to claim 20, wherein, to detect that the synchronization between the first signal and the second signal is lost, the detector is further configured to make a comparison between a phase of the first signal and a phase of the second signal.

24. The communication system according to claim 20, wherein the detector is further configured to detect a change in a frequency of the second signal by counting a number of pulses in the second signal.

* * * * *